Patented Nov. 2, 1926.

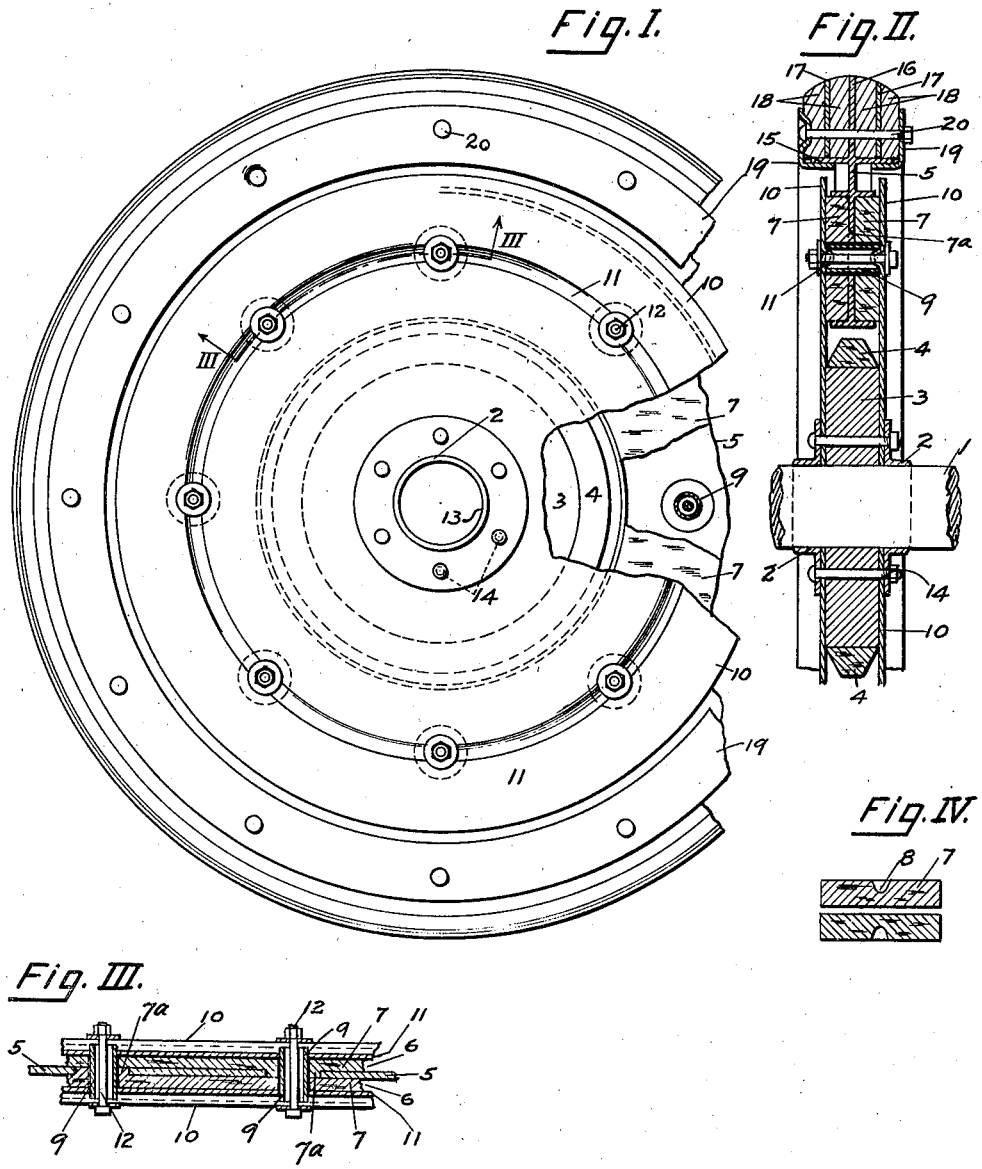

1,605,257

UNITED STATES PATENT OFFICE.

LINDSAY McKEE AND CHARLES A. ROACH, OF PORTLAND, OREGON.

RESILIENT VEHICLE WHEEL.

Application filed August 6, 1924. Serial No. 730,464.

Our invention relates to resilient vehicle wheels as a class.

The object of our invention is to provide a device of this class particularly adapted to any vehicle, the operation of which may be thereby facilitated or made more practical, convenient or economical. It is particularly adaptable to motor vehicles, but may be adapted with practical results to hand trucks, roller skates and various other articles requiring wheels. We also provide therein an arrangement of parts tending to give the wheel great resiliency in connection with a tire of solid material, which obviates the difficulties attendant upon the usual types of pneumatic tires. These objects, as well as other advantages, we attain by the construction, combination and arrangement of parts illustrated in the accompanying drawings which form a part hereof.

Fig. I is a side view of a portion of the wheel with parts broken away.

Fig. II is a transverse sectional view of a portion of the wheel on a line from the tire through the center of the hub.

Fig. III is a sectional view of parts on the line III—III in Fig. I.

Fig. IV is a transverse section through the filler bands.

Like characters refer to like parts in all views.

In Fig. II a vehicle shaft 1 is represented, with a hub 2 thereon. If the shaft transmits power and is rotatable, the hub is keyed upon same, otherwise if the shaft is rigid, the hub rotates thereon. A collar 3 is rigidly secured to the hub 2. About the collar 3 a buffer ring 4 is placed. The buffer is of resilient material, such as heavy rubber, and is preferably secured rigidly to the collar 3. About the buffer is a metallic central disk member 5, having a central opening to receive the buffer therein with a convenient clearance space between them. The member 5 has opposing concentric channels 6 adjacent to its inner periphery. Within these channels are placed circular filler ring bands 7 of rubber or other resilient material. The bands 7 have circular grooves 8 in their outer surfaces. The member 5 has a series of openings of a conveniently large diameter as shown in Fig. III. These openings may be even larger if required for better resiliency. The bands 7 have integral lugs 7ª, of the diameter of said openings and are to be received in the opposing openings to fit in the same snugly. There is also a series of openings through said lugs in alignment with the central parts of the openings in the member 5. Sleeves 9 extend through said openings in the lugs and member 5. Upon opposite sides of the member 5 are central disks 10. These have concentric ribs 11 on their inner surfaces, arranged to be introduced into the band grooves 8 and to engage the bands therein. The ends of the sleeves 9 engage the inner surfaces of the disks 10 to retain them at a predetermined distance apart and prevent any greater lateral pressure of these disks upon the bands than is required by their engagement in said grooves to retain the bands snugly in position and prevent their tendency to rotate or warp in the channels. The sleeves are also of a length to retain the surfaces of the disks 10 away from engagement with the opposing edges of the channel walls. Bolts 12 extend through the sleeves 9 and are the means of securing the disks 10 to each other about the sleeve openings. The sleeves also tend to prevent the bands from rotating. The disks 10 also have central openings 13 to allow passage of the shaft 1 through them, and adjacent openings 14 to allow the passage of bolts to secure them rigidly to the hub 2. The member 5 extends outwardly from the outer channel wall to an integral felloe band 15. An integral, circular spacing member 16 extends from the felloe 15 outwardly to the periphery of the wheel tread. One or more similar spacing members 17 may be positioned in the tire, parallel with the member 16, on each side thereof and extending from the felloe surface to the outer surface of the tire. Adjacent to the spacing members, a tire material 18 is filled in from the felloe outwardly to a curved surface of common type tire form, the filler as thus placed composing with the spacing members, such a tire as a whole. A series of lateral openings are oppositely disposed in alignment in the tire filler and members, and circular tire holders 19, having similarly positioned openings, are placed over the sides of the tire and are secured to each other by bolts 20, extending through the aforesaid openings, to lock the holders into engagement with the opposing sides of the tire, and into operative position. The tire material is solid and preferably of a fibre composition commonly known as friction fibre. The head of the bolt 20 may be countersunk, as shown in Fig. II, and the opposing nut may also be countersunk if desired, which is to aid in preventing them from shearing should obstacles engage them.

It will now be seen that when the wheel is placed upon a vehicle, the hub portion is practically hung upon the rubber ring bands 7 and is supported by them above and vertically over the center of the wheel tread, while below the rubber bands the pressure of the tire is vertically upward against the bands in reacting against the load pressure. This gives resiliency to the vehicle support on the wheel at any radius of its position of tread in the travel path. Should a vehicle having this wheel be overloaded, or the wheel strike an obstacle, which in either case exhausted the rubber band resiliency, the strain of impact beyond this is taken up by the buffer 4, and its resiliency tends to obviate and overcome any sudden jolt. It will further be seen that the solid tire is secured to the member 5 and this member extends inwardly between the rigid disk plates 10, but free of direct engagement with them. The rubber bands receive the impact movement of the member 5 at any radius of the tread. The bands transmit this impact with resilient effect in engagement with the rigid sleeves which are positioned away from the surrounding edges of the member 5. The bands are transversely secured by the disks 10 which aid in receiving part of the impact by their engagement therewith. Thus it is that the solid tire is given a resilient action in all radial directions. The arrangement of cushion filler bands takes up any side thrust, and the construction and position of the securing parts is such that the wheel will not ordinarily bend or break when in violent contact with an obstacle at one side. In such case the damage is generally a bending or breaking of the shaft, which ordinarily happens anyway when a wheel of common type is broken by such accident. The metallic spacing rim members tend to grip the travel path when the wheel slides sidewise and to prevent skidding to a great enough extent to obviate accidents from this cause. The wheel construction provides a resiliency which will equal that of the common type pneumatic arrangement. It has in addition the advantages of operation without punctures or blow-outs and the tire material does not tend to allow the suction which prevails in tires made with rubber treads. In our wheel this friction is done away with and makes it a faster traveller and more economical with fuel. The tire surface is also impervious to moisture and fire, or to disintegration or injury because of contact with oils, grease, and other foreign substances. The tire will also outlast any of common type and the rubber bands and buffer, being inclosed and protected will wear for very long periods with good service and can be easily and cheaply replaced. The wheel is adapted to be exchanged with another very quickly by simply removing the whole wheel. The device will comply with all legal requirements now in force respecting the use of vehicles on public highways. The width, weight and arrangement may be adapted to light and heavy vehicles. The device can also be made and adapted for roller skates, hand-trucks and a great variety of articles requiring wheels. The buffer is intended principally for trucks and heavy vehicles. It can be omitted in lighter vehicles and the wheel will be operative as described with great efficiency.

We claim:

1. A wheel having, in combination, a hub; a rubber buffer ring concentric with said hub; a rim ring concentric with said buffer ring and normally spaced therefrom, said ring having openings formed therein; a rubber filler ring on each side of said rim ring, said filler rings occupying said openings; spacer tubes passing through the rubber in said openings parallel with the wheel axis; a central disk mounted at each side of said hub; and bolts for clamping said disks against said rubber bands and said tube spacers.

2. A wheel having, in combination, a hub; a concentric rubber buffer ring attached to said hub; a rim ring concentric with said buffer ring and normally spaced therefrom, said rim ring having an annular channel formed on each side thereof having holes formed therein connecting said channels; a rubber filler ring occupying each of said channels and filling certain of said holes; spacer tubes passing through the rubber in said holes; a concentric disk member at each end of said hub; and bolts passing through said spacers and said disk members.

3. A wheel having, in combination, a hub; a rubber buffer ring attached thereto and concentric therewith; a rim ring having a flanged central opening spaced from said buffer ring and not contacting therewith except under extreme loads; an annular channel formed around said central opening at each side of said rim ring, said rim ring having holes formed around the bottom of said channels; rubber band rings occupying said channels and holes, a central disk rigidly mounted at each end of said hub, each of said disks having a concentric bead formed therein, said rubber band rings having corresponding grooves formed therein adapted to receive said beads and passing through the axes of said rim ring holes; tubular spacers passing through the rubber in said holes; and bolts passing through said spacers and disk beads for clamping said rim ring and band rings between said central disk members.

LINDSAY McKEE.
CHARLES A. ROACH.